Nov. 17, 1942.  G. RAYMOND ET AL  2,302,252
THERMOSTATIC VALVE
Filed Dec. 26, 1940   2 Sheets-Sheet 1
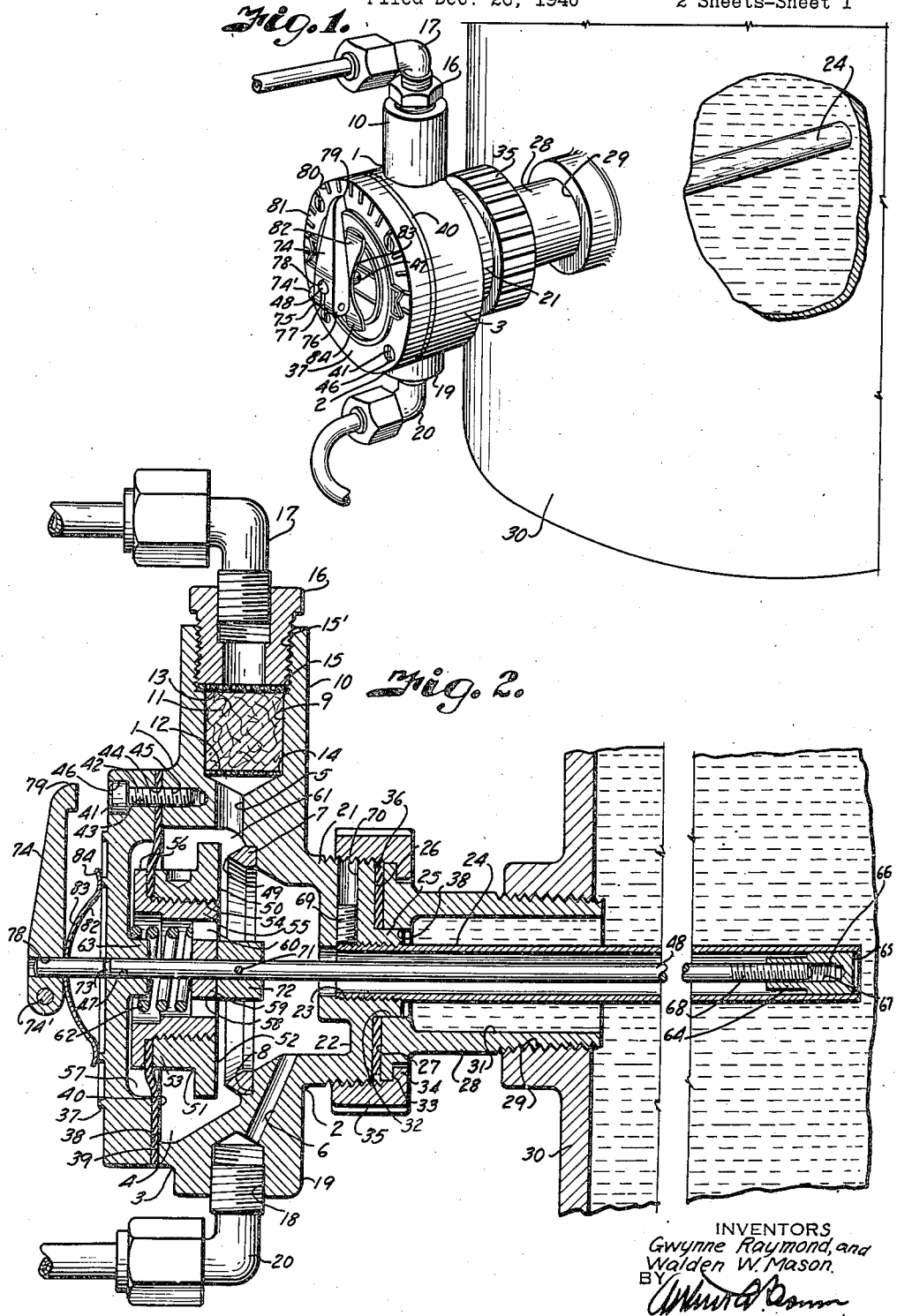
INVENTORS
Gwynne Raymond, and
Walden W. Mason.
BY
ATTORNEY

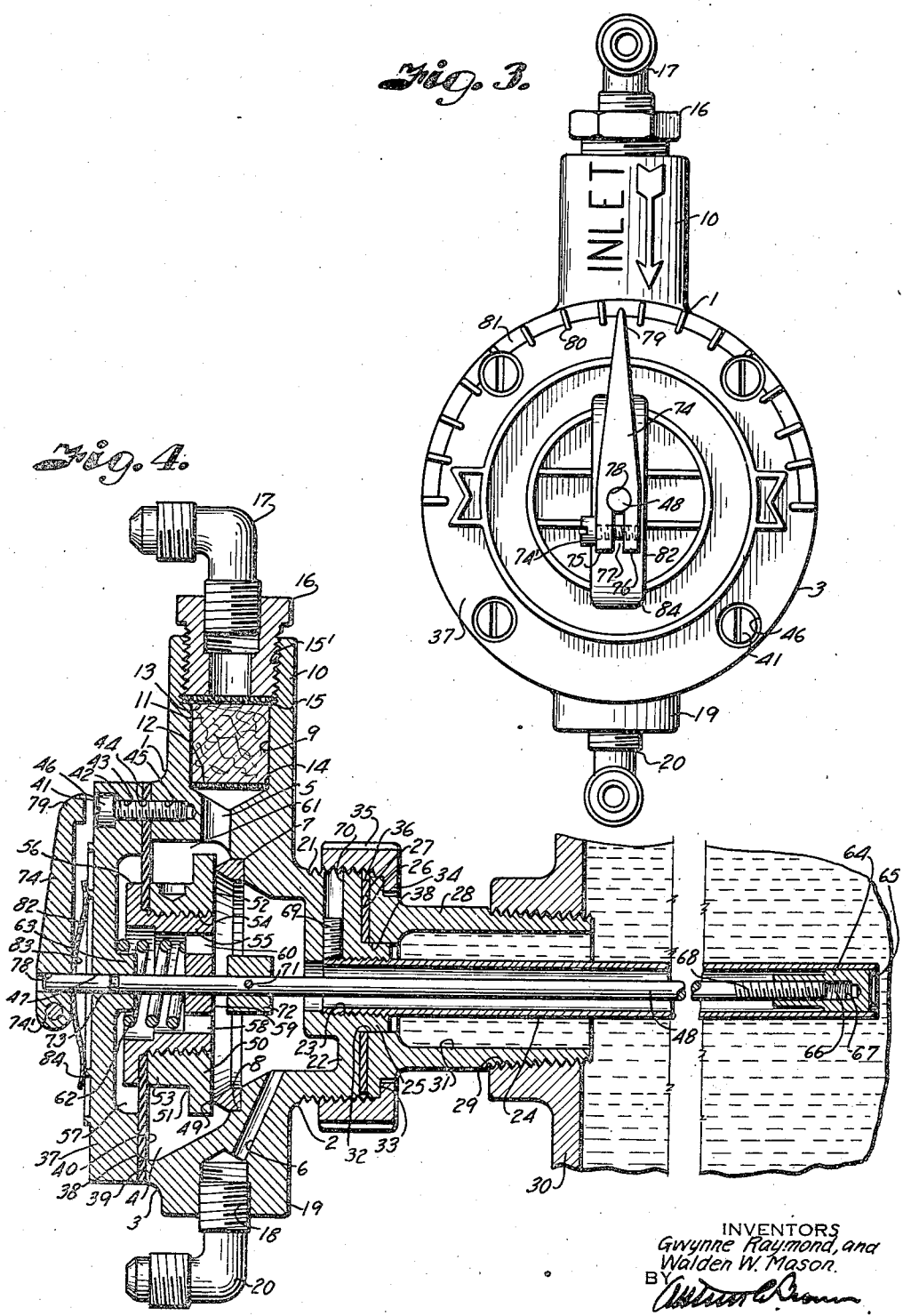

Patented Nov. 17, 1942

2,302,252

UNITED STATES PATENT OFFICE 2,302,252

THERMOSTATIC VALVE

Gwynne Raymond, Oklahoma City, Okla., and Walden W. Mason, Kansas City, Mo.

Application December 26, 1940, Serial No. 371,692

7 Claims. (Cl. 137—139)

This invention relates to thermostatic valves for controlling flow of a fluid responsive to a zone of changing temperature, and has for its principal object to provide a valve of this character which is sensitive to temperature changes and of positive action so as to obtain accurate control of the fluid.

Other objects of the invention are to provide a thermostatic valve of simple construction and inexpensive to install; to provide a thermostatic valve construction wherein the valving element is substantially balanced with respect to the high pressure side of the valve; and to provide a thermostatic valve construction capable of handling a large volumetric flow without use of pilot and master valves.

It is also an object of the invention to provide an improved construction which facilitates mounting of the thermostatic elements in a vessel and eliminates the necessity of disconnecting the fluid supply lines when the thermostatic elements are to be removed from the vessel.

In accomplishing these and other objects of the invention, as hereinafter pointed out, we have provided improved structure, the preferred form of which is illustrated in the accompanying drawings, wherein:

Fig. 1 is a fragmentary perspective view of a vessel equipped with a thermostatic control valve constructed in accordance with the present invention.

Fig. 2 is a longitudinal section through the valve and portion of the vessel to which it is connected, the valve plug being shown in unseated position.

Fig. 3 is a front elevational view of the valve.

Fig. 4 is a section similar to Fig. 2, but showing the valve plug in seated position for shutting off flow through the valve.

Referring more in detail to the drawings:

1 designates a thermostatically actuated valve constructed in accordance with the present invention, and which includes a head 2 containing the valving element and carrying the thermostatic member later described. The head 2 includes a hollow member 3 having a valve chamber 4 therein that is provided with inlet and outlet ports 5 and 6 offset on the respective sides of a valve seat insert ring 7, inset within an annular shoulder 8 formed in the wall of the valve chamber. The inlet port 5 connects with a passageway 9 in a lateral branch 10 containing a filtering material 11 which is retained in position between apertured plates 12 and 13. The plate 12 seats on the peripheral edge 14 of a conical terminal of the bore forming the fluid passageway 9 and the plate 13 seats on an annular shoulder 15 formed by an internally threaded counterbore 15'. The perforated plates, including the filtering material, are retained in position by a threaded bushing 16 having internal threads for receiving a pipe connection 17, whereby a fluid is admitted to the valve under pressure. The outlet port 6 connects with an internally threaded socket 18 in a lateral branch 19 and threaded therein is an outlet pipe connection 20.

The member 3 is further provided with a neck 21 arranged coaxially with the valving chamber and having a closed end 22 provided with an internally threaded axial opening 23 to mount the threaded end of a thermostat tube 24. The neck 21 is provided with a centering collar or boss 25 encircled by a gasket seating face 26 cooperating with a similar face 27 of a nipple 28 that is adapted to be threaded, for example, into an opening 29 of a vessel 30. The nipple has an enlarged inner bore 31 adapted to connect directly with the interior of the vessel, and a smaller outer bore 32 for passing the centering collar 25, as shown in Fig. 2. The nipple 28 has an annular shoulder 33 engaged by the internally extending flange 34 of a union nut 35, which is provided with internal threads to engage external threads on the neck 21 to draw the faces 26 and 27 into sealing contact with a gasket ring 36, and to retain the head of the valve in fixed relation with the nipple 28. The side of the valving chamber opposite to the valve seating ring is closed by a cover plate 37, having an annular clamping face 38 cooperating with a similar face 39 on the member 3 to clamp the marginal edge of a flexible diaphragm 40 therebetween, the plate being retained by fillister screws 41, having their shanks 42 extending through openings 43 in the cover plate, and through registering openings 44 in the diaphragm into threaded sockets 45 of the member 3, as shown in Figs. 2 and 3, the heads of the screws preferably being inset in recesses 46 in the outer side of the cover plate 37. The cover plate 37 has an axial bearing opening 47 to pass the outer end of a thermostat rod 48 extending coaxially of the tube 24.

The valve seating ring has a forwardly extending portion terminating in a circular line contact seating edge 49 engaged by a valving member or plug 50 carried by the flexible diaphragm 40. The valve plug includes a ring-like body 51, having a substantially flat face 52 engaging the seat 49 and provided with a collar 53 engaging the inner face of the diaphragm. The body of the valve plug, including the collar 53, is internally threaded, as at 54, and is secured to the diaphragm by a sleeve 55 projected through the diaphragm and threaded into the plug. The sleeve carries a circumferential flange 56 on the outer end thereof to cooperate with the collar 53 in clamping the diaphragm. The flange of the sleeve 55 is located within a recess 57 formed in the face of the cover plate and which substantially conforms in diameter to that of the valve plug. The inner end of the sleeve has a spider 58, carrying a central bearing 59 cooperating with the bearing 47 in slidably mounting the thermostat rod. The arms of the spider provide openings 60 connecting the outlet side 61 of the valving chamber with the recess 57.

The valve plug is normally retained in seated position to close flow through the valving chamber by a coil spring 62, having one end bearing against the spider 58 and the other end against the cover plate, the outer end of the spring being retained in coaxial relationship with the thermostatic rod by a boss 63 on the cover plate.

The thermostatic tube 24 is of sufficient length to project the desired distance within the vessel, and the inner end thereof carries a plug 64 that is welded thereto, as at 65, to close the tube and seal off flow of liquid to the vessel from the valving chamber. The plug 64 has an axial socket 66, provided with internal threads 67 to engage external threads 68 on the inner end of the thermostat rod 48. The thermostat tube is formed of a metal having a different coefficient of expansion than that of the rod so that a change of temperature occurring in the vessel causes a differential movement between the rod and tube to effect seating and unseating of the valve plug as later described. For example, the rod may be formed of Invar and the tube of stainless steel, as these materials have sufficient differential in coefficient of expansion to provide the necessary movement of the valve plug upon relatively slight changes in temperature of the fluid in the vessel.

The inner end of the thermostat tube is preferably locked in position by means of a set screw 69, threaded into a radial opening 70 formed in the neck 21 and which is positioned so that the outer end thereof is covered by the union nut 35, previously described.

Fixed to the valve rod by means of a pin 71 is a valve collar 72, normally spaced from the valve plug when the valve plug is in seated position, but which is adapted to engage the spider 58 of the valve plug assembly to effect unseating of the plug upon differential expansion and contraction of the tube and rod, as later described. The outer end of the thermostat rod is preferably provided with an oil seal groove 73 operable to prevent leakage about the opening 47, the end of the rod projecting sufficiently from the opening to mount a lever arm 74. The lever arm 74 is adjustably located radially of the rod by means of a clamping screw 74' extending through ears 75 and 76 on the arm, the ears being spaced apart to provide a slot 77 intersecting the opening 78 which receives the rod. The lever arm, therefore, is adapted to be selectively positioned on the rod and retained in adjusted position by tightening the screw 74'. The outer end of the arm terminates in a pointer 79 operating over the graduations 80 of a scale 81 that may be provided on the periphery of the cover plate as shown in Fig. 3. To resist turning of the rod and support the lever arm in position relatively to the scale, the outer end of the rod carries an arch-shaped spring 82 having its arch portion 83 bearing against the lever arm and its ends 84 bearing against the cover plate.

The valve is installed by first applying the nipple 28 into the opening 29 of the vessel 30, the union nut 35 having been previously sleeved thereover. The valve assembly, including the thermostat tube and rod, is then passed through the nipple so that the centering boss 25 enters the opening 32. The nut is then threaded onto the neck 21 to draw the faces 26 and 27 into sealing contact with the gasket ring 36. The liquid supply lines may then be coupled with the pipe connections 17 and 20, the connection 17 being connected with the source of fluid supply and the connection 20 with a burner or other heating appliance to heat the contents of the vessel. When the liquid is below the set temperature to be maintained in the vessel, the tube 24 has contracted so that the stop collar 72 engages the valve plug and retains it from engagement with its seat. Fluid is then being supplied through the connection 17, filtering material 11, and port 5, into the valving chamber and through the seating ring for flow through the port 6 and connection 20. When the temperature of the liquid in the vessel reaches the desired point, or rather that at which the pointer 79 has been set on the scale 81, the tube has elongated to bring the stop collar 72 away from the valve plug, allowing the spring 62 to move the valve plug into engagement with its seat 49, shutting off flow of fluid through the valve. When the temperature again drops in the vessel the tube contracts so that the rod is moved longitudinally with respect thereto, and the stop collar engaging the valve plug again unseats the plug and allows flow of fluid through the valve. The valve may be made to seat at any selected predetermined temperature as indicated on the scale, by adjusting position of the pointer relatively to the graduations. This movement varies position of the stop collar relatively to the valve plug and controls opening and closing of the valve at various degrees of elongation of the thermostat elements.

Attention is directed to the fact that the fluid pressures on the supply side or upstream side of the valve act substantially equally on the plate portion thereof and on the effective area of the diaphragm. Likewise pressures are also balanced on the outlet side of the valve since the fluid is admitted to the outlet side of the diaphragm through the opening 60 and recess 57. The effective area on that side of the diaphragm is substantially equal to the port area of the valve so that the pressure is applied equally to the respective sides of the valve plug. This balancing feature permits the use of the device to control flow of high pressure fluid and gives a more sensitive operation with better control of temperatures. By providing rather large inlet and outlet ports 5 and 6, the valve will handle rather large volumes of fluid so that it is suitable for use without a secondary valve to control a main supply of fluid.

From the foregoing it is obvious that we have provided a thermostatically controlled valve which is of simple, inexpensive construction and which is adapted for positive operation and effects accurate control of temperatures in the vessel.

What we claim and desire to secure by Letters Patent is:

1. A valve for handling fluids under fluctuating pressures including, a head having a chamber therein provided with a seat with an inlet port on one side of said seat and an outlet port on the other, a diaphragm in the chamber, a valve plug supported by the diaphragm in axial alignment with said seat and having openings therethrough for admitting pressure medium on the seating side of said valve plug to act on the side of the diaphragm opposed to said seat, said diaphragm having effective areas on the respective sides of the diaphragm corresponding in area to the effective pressure areas of the valve.

2. A valve of the character described including, a head having a chamber therein provided with a seat with an inlet port on one side of the seat and an outlet port on the other, a diaphragm in the chamber, and a valve plug supported by the diaphragm in axial alignment with said seat and having an opening therethrough for admitting pressure medium from the seat engaging side of said valve plug to act on the side of the diaphragm in the seating direction of the valve plug, said diaphragm having an effective area on the valve side thereof substantially conforming in area to that on the adjacent face of the valve plug whereby fluid pressures acting upon the respective faces of the valve plug are balanced out.

3. A valve including, a head having a chamber therein provided with a seat with an inlet port on one side of said seat and an outlet port on the other side of said seat, a diaphragm in the chamber on the inlet side of said seat, and a valve plug supported by the diaphragm in axial alignment with said seat and having a port for admitting pressure medium from the outlet side of said seat to act on the diphragm in the direction of seating the valve plug, said valve plug having pressure portions substantially equal in area to the corresponding areas of the diaphragm for balancing the valve under varying pressures.

4. A valve including, a head having a member forming a valving chamber provided with a valve seat and inlet and outlet ports, a cover member closing said chamber, a diaphragm clamped between said members, a valve plug carried by the diaphragm in coaxial alignment with said seat, a spring seating said valve plug, a rod slidable through bearing openings in the valve plug and in said cover plate, a collar on said rod engageable with the valve plug for unseating the valve plug against pressure of said spring upon shift of said rod, and means for adjusting said rod to position the collar relatively to the valve plug.

5. In a valve of the character described, a head having a valving chamber provided with a valve seat, an inlet port on one side of the seat and an outlet port on the other side of the seat, a flexible diaphragm in the chamber on the inlet side of said seat, a valve plug having an annular flange substantially conforming in area to the effective area of the diaphragm and provided with a threaded axial opening, a clamping sleeve projected through the diaphragm and threadedly engaged in said opening to secure the valve plug to the diaphragm, a port in said sleeve for admitting pressure medium from the outlet side of the valve plug to act on the diaphragm in the seating direction of said valve plug, said area of the valve plug exposed to the outlet pressure being equal to the effective area of said diaphragm, a spider in said sleeve, a spring in said sleeve engaging the spider to urge the valve plug to seated position, and means for unseating the valve plug.

6. A valve for handling fluids under fluctuating pressures including, a head having a chamber therein provided with a seat member and having an inlet port on one side of said seat member and an outlet port on the other, a diaphragm in the chamber, and a valve plug member supported by the diaphragm in axial alignment with said seat and having an opening therethrough for admitting pressure medium on the seating side of said valve plug member to act on the side of the diaphragm opposed to said seat member, one of said members having a circumferential knife edge portion engaged by the other member to reduce the non-effective area on the valve plug member to a minimum, said diaphragm having effective areas on the respective sides thereof corresponding in area to the effective pressure areas of the valve.

7. In a valve of the character described, a head having a valving chamber provided with a valve seat member, an inlet port on one side of the valve seat member and an outlet port on the other side of the valve seat member, a flexible diaphragm in the chamber having a side subject to pressure from said inlet port, a valve plug member provided with an internal opening, a clamping element cooperating with the plug member to engage the diaphragm therebetween and having an opening coaxial with the axial opening of the valve plug member for admitting pressure fluid from the outlet port to the other side of the diaphragm, a spring normally seating the valve plug member, and means for unseating the valve plug member, one of said members having an annular knife edge portion encompassing the area of the valve plug member exposed to the pressure fluid from the outlet port, said encompassed area being substantially equivalent to the effective area of the diaphragm acted upon by said outlet pressure whereby the fluid pressures acting to move said valve are substantially balanced out and said unseating means acts substantially solely against the action of said spring.

GWYNNE RAYMOND.
WALDEN W. MASON.